Sept. 12, 1939.  E. W. BREISCH  2,172,815
CHARGING CONTROL DEVICE FOR BATTERIES
Filed July 5, 1935  2 Sheets-Sheet 1
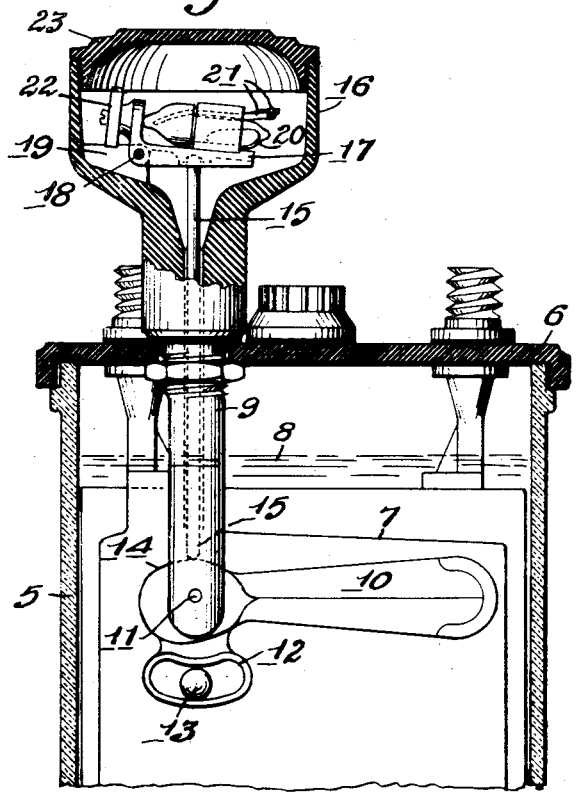
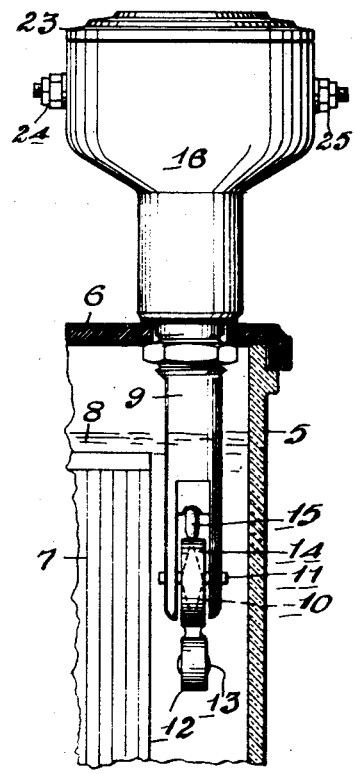
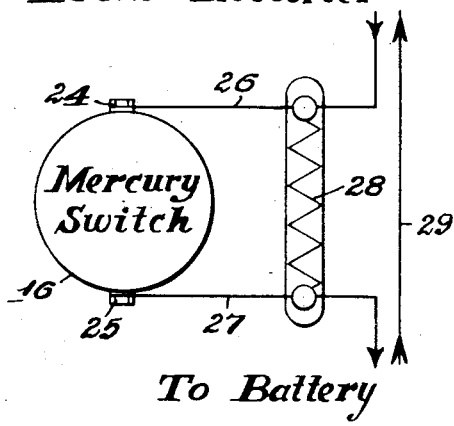
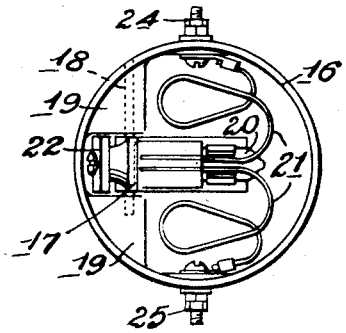
INVENTOR
Edgar W. Breisch
BY
ATTORNEYS Sept. 12, 1939.   E. W. BREISCH   2,172,815
CHARGING CONTROL DEVICE FOR BATTERIES
Filed July 5, 1935   2 Sheets-Sheet 2

Inventor
Edgar W. Breisch
By
Attorneys

Patented Sept. 12, 1939

2,172,815

UNITED STATES PATENT OFFICE 2,172,815

CHARGING CONTROL DEVICE FOR BATTERIES

Edgar W. Breisch, Lancaster, N. Y., assignor to National Battery Company, St. Paul, Minn., a corporation of Delaware Application July 5, 1935, Serial No. 30,026

5 Claims. (Cl. 200—84)

It is an object of this invention to provide novel means for automatically controlling the charging of storage batteries.

A particular object is to provide a device of this class in which the charging of the battery is regulated by an electric switch operable by mechanism immersed in the battery electrolyte and movable in response to changes in the specific gravity of the electrolyte.

The invention is particularly, although not exclusively, adapted for use in connection with the batteries used in railway track and signal circuits. In emergencies, such as are caused by delayed trains and wrecks, there are greatly increased withdrawals of current from the batteries and it is important to recharge the batteries rapidly. By the use of the present invention the charging is regulated automatically and economically.

Referring to the drawings, which illustrate the best form of my device at present known to me:

Figure 1 is a partial side elevation and partial vertical section through my device mounted on a battery, the container of which is shown in section;

Fig. 2 is a side elevation of the device as viewed from the left of Fig. 1, with a fragmentary portion of the battery shown in section;

Fig. 3 is a plan view of the switch with the cap removed;

Fig. 4 is a diagram illustrating suitable connections between the switch and a rectifier or charging circuit for the battery.

Figure 5:
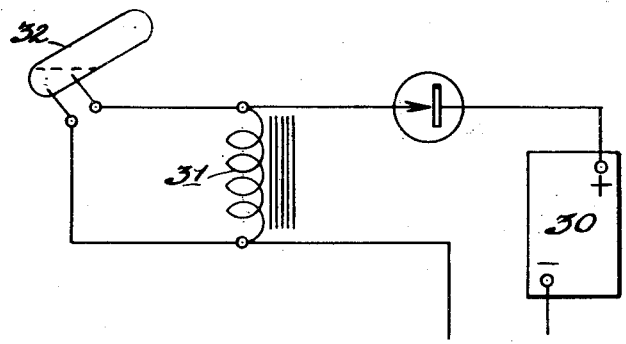
Figs. 5, 6 and 7 are diagrammatic illustrations of my controlling device in circuits with various types of charging apparatus.

In the drawings, the numeral 5 indicates the container of a battery having a cover 6 and groups of plates 7 immersed in an electrolyte 8. The cover 6 is perforated to receive a tubular supporting member 9 which projects down into the electrolyte between the plates 7 and one of the walls of the container 5, as indicated in Fig. 2. The lower end of the support 9 is bifurcated and has a float arm 10 secured thereto by a pivot pin 11. Rigidly connected to the arm 10 is a holder 12 for a counterpoise 13. This counterpoise and the arm 10 are so arranged and of such buoyancy as to cause said arm to move from the substantially horizontal position indicated in Fig. 1 to substantially vertical position when the specific gravity of the electrolyte changes from its maximum, or fully charged value, to its minimum or discharged value, the arm having a balanced, intermediate position for each intermediate value of the specific gravity.

A cam 14 is formed integral with the arm 10 and has resting on its upper periphery a small, vertical rod 15 which is movable longitudinally in the axial bore of the support 9. The rod 15 projects into a bell-shaped switch housing 16 mounted on the upper end of the support 9. A mercury type of switch is so pivoted in the housing 16 as to rest on the upper end of the rod 15 and to be tilted to closed position when said rod is raised. The switch has a tiltable member 17 mounted on a pivot pin 18 having bearings in a pair of lugs 19 formed integral with the housing 16. A small tube 20 containing the mercury of the switch is mounted on the member 17 and circuit wires 21 have terminals so located in the tube 20 that the mercury completes the circuit between these wires when the rod 15 is raised from the position shown in Fig. 1. A counterweight 22 is mounted on the member 17 so that said member rests lightly on the upper end of the rod 15 and may be readily tilted to open or close the switch, as the case may be. A removable cap 23 is mounted on the top of the housing 16 to allow access to the switch.

Mounted on the exterior of the housing 16 are binding posts 24 and 25 connected electrically to the wires 21 respectively and adapted to be joined to external circuit wires 26 and 27 indicated in Fig. 4. As further indicated by the legend in Fig. 4, the wire 26 extends to the rectifier or charger for the battery and the wire 27 extends to one of the terminals of the battery to be charged. The circuit may be completed through ground connections or a wire 29, as will be readily understood, so that when the mercury switch is closed the battery is charged. A resistance device 28 may be shunted across the terminals of the mercury switch to permit the battery to be charged slowly by the common "trickle" method when the mercury switch is open.

As a substitute for the resistance device 28, I have illustrated in Fig. 5 suitable connections for charging a battery 30 using half wave rectified current and a reactor 31 which may be shunted out of the circuit when the mercury switch 32 is closed.

Figure 6:
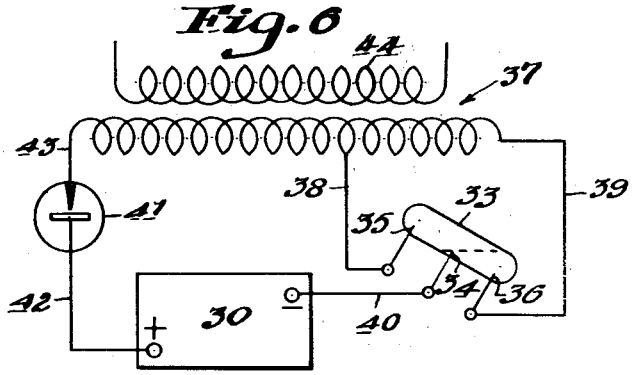

In Fig. 6 the battery 30 is arranged in circuit with the mercury switch 33 having a central contact 34 adapted to be connected electrically with either of the contacts 35 or 36. A transformer, indicated generally by the numeral 37, has the contact 35 connected by a tap wire 38 to one of its intermediate coils and the terminal 36 connected by a wire 39 to the end of the same coil. A wire 40 connects the contact 34 with the battery 30 to be charged. This battery is placed in series with a rectifier 41 and with the same transformer coil by wires 42 and 43. Alternating current is supplied to a coil 44 of the transformer 37.

Figure 7:
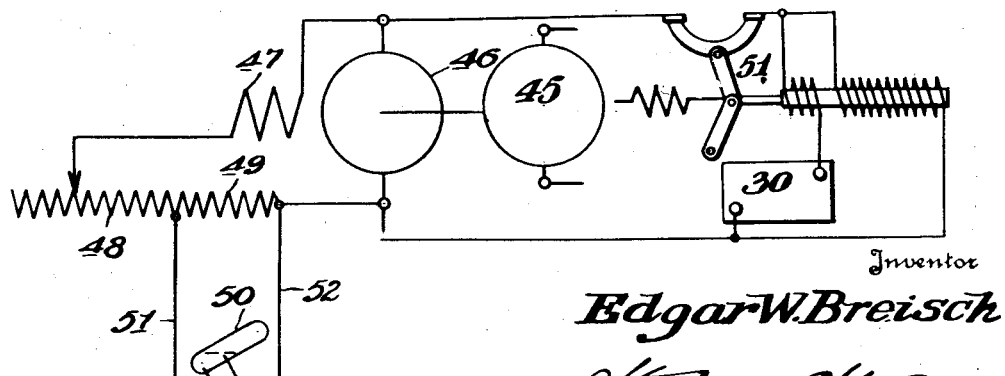

Referring to Fig. 7, which illustrates my control device in circuit with a charger of the motor-generator type, a motor 45 operates a generator 46 having a shunt-wound field coil 47 in circuit with a rheostat 48. This rheostat has a portion 49 of its resistance arranged to be shunted by a mercury switch 50 and circuit wires 51 and 52. The battery 30 is arranged to be charged by the generator 46 and the rate of charging is under control of the switch 50, as hereinafter described. A circuit breaker 51 having shunt and series wound trip coils is provided to open the charge circuit upon reversal of the load current or reduction from any cause of the generator voltage below the battery voltage.

*Operation*

In operation, assuming the battery to be fully charged, the float arm 10 assumes its substantially horizontal position, indicated in Fig. 1, so that the mercury switch in the housing 16 is retained in its open position. As the battery is discharged, the specific gravity of the electrolyte 8 is reduced and the arm 10 moves down while the counterpoise 13 opposes the tilting and prevents the arm from suddenly dropping to its vertical position. When the specific gravity has been reduced to a predetermined point, the cam 14 raises the rod 15 sufficiently to cause the mercury in the tube 20 to complete the circuit between the wires 21. This shunts the resistance 28 (Fig. 4) by closing the mercury switch and thereby causes the battery to be charged at the maximum rate of the rectifier or charger. The charging continues until the specific gravity of the electrolyte has been increased sufficiently to raise the arm 10, permitting the rod 15 to move down and causing the mercury switch to open the circuit between the wires 21.

As will be readily understood the mercury switch 32 shown in Fig. 5 may be arranged to be tilted to its closed position by the rod 15 so as to shunt the reactor 31 and thereby increase the rate of charging when the specific gravity of the electrolyte is reduced.

With the type of charging apparatus illustrated in Fig. 6 the mercury switch 33 is tilted to complete the circuit between the terminals 34 and 36 when the high rate of charging is required. This completes the circuit including battery 30, wire 40, switch 33, wire 39, entire secondary coil of the transformer 37, wire 43, rectifier 41 and wire 42. When the charge of the battery has been restored to normal the switch 33 is allowed to return to its position in which the mercury completes the circuit between the terminals 34 and 35 so that the battery is charged at the lower rate through the tap wire 38 and portion only of the secondary transformer coil. As will be readily understood, the switch 33 may be arranged to shunt a portion of the primary coil of the transformer instead of a portion of the secondary coil, if desired.

With the motor generator set shown in Fig. 7 the mercury switch 50 controls the resistance of the field circuit by shunting the portion 49 of the resistance in that circuit when the rate of charging is to be increased.

I prefer to construct the rod 15 from glass or other insulating and acid-resistant material and to construct the tubular support 9, housing 16 and float arm 10 from suitable moldable composition having like properties. The counterpoise 13 may be constructed from lead or other suitable material of greater density than the material from which the arm 10 is constructed and is adjustable in the arcuate holder 12 to compensate for electrolytes of various types. The counterpoise 13 is retained in the selected position in the holder 12 by suitable means, such as an adhesive or by plastic composition placed at either side thereof in the opening in the holder 12.

A small lead pellet may be employed as the counterpoise 13 and this pellet may be molded or pressed directly into the rubber composition or it may be inserted in the form of a rivet or as a screw. The weight or volume may be varied to provide different compensating effects for different batteries. Thus in every case, by suitable adjustment of the compensating weight, the float arm may be caused to assume a substantially vertical position when the battery is completely discharged and a substantially horizontal position at full charge.

Having described my invention, what I claim as new and desire to protect by Letters Patent is:

1. A charging control device for a battery comprising, a supporting member depending from the top of said battery into the electrolyte therein, a float arm having a specific gravity intermediate of the minimum and maximum specific gravity of the electrolyte and pivotally supported on said member beneath the surface of the electrolyte and movable from substantially horizontal to substantially vertical position therein, a counterpoise connected to said arm, a switch actuating means operable by said arm beneath the surface of the electrolyte, a switch mounted above said member and a rod movable by said means to actuate said switch.

2. A charging control device for a battery comprising, a hollow supporting member extending through and depending from the top of said battery into the electrolyte therein, a float arm pivotally supported on the lower end of said member and movable in said electrolyte from a substantially horizontal to a substantially vertical position therein in response to changes in the specific gravity thereof, a switch housing fixed on the upper end of said member, a cam operable by said arm, a switch mounted in said housing and a rod operable by said cam, extending through said hollow member and operatively connected to said switch whereby said switch is actuated in response to changes in the specific gravity of said electrolyte.

3. In a storage battery having an electrolyte, a float arm pivotally mounted in said electrolyte, constructed entirely from a material having a specific gravity intermediate of the minimum and maximum specific gravities of said electrolyte and movable in response to specific gravity changes in the electrolyte from a substantially horizontal to a substantially vertical position, an electric switch mounted above said arm and freely movable means operatively connecting said arm to said switch to actuate said switch in response to specific gravity changes in said electrolyte.

4. In a storage battery having a cover and containing a liquid electrolyte, an electric switch mounted on said cover, a rod depending from said switch into the battery and freely movable substantially vertically to actuate said switch, a pivoted support for the lower end of said rod and means for pivoting said support to actuate said rod in response to specific gravity changes in said electrolyte comprising a single unitary arm operatively connected to said support, continuously submerged in the electrolyte and movable therein from substantially vertical to substantially horizontal position, said arm having a higher specific gravity than the minimum specific gravity of said electrolyte and being formed to guard against the adherence of gas bubbles thereto.

5. In a storage battery having a cover and containing a liquid electrolyte, an electric switch mounted on the cover of said battery, a rod depending from said switch into the battery and freely movable substantially vertically to actuate said switch, a cam pivotally mounted in the battery and slidably supporting said rod to actuate the same and means for turning said cam in response to specific gravity changes in said electrolyte comprising, a single, unitary member operatively connected to said cam and having a lower specific gravity than the maximum specific gravity of said liquid, and a higher specific gravity than the minimum specific gravity of said electrolyte, said member being formed to minimize the adherence of gas bubbles thereto.

EDGAR W. BREISCH.